US012691904B2

(12) United States Patent
Sakai et al.

(10) Patent No.: US 12,691,904 B2
(45) Date of Patent: Jul. 28, 2026

(54) VEHICLE CONTROL DEVICE AND VEHICLE CONTROL METHOD

(71) Applicant: DENSO CORPORATION, Kariya-city (JP)

(72) Inventors: Asuka Sakai, Kariya-city (JP); Taro Kobayashi, Kariya-city (JP); Natsuko Miyazaki, Kariya-city (JP); Masafumi Nohara, Kariya-city (JP); Haozhou Li, Kariya-city (JP); Kazuhiro Matsui, Kariya-city (JP); Jinhae Choi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 148 days.

(21) Appl. No.: 18/507,934

(22) Filed: Nov. 13, 2023

(65) Prior Publication Data

US 2024/0083459 A1　　Mar. 14, 2024

Related U.S. Application Data

(63) Continuation of application No. PCT/JP2022/020382, filed on May 16, 2022.

(30) Foreign Application Priority Data

May 26, 2021　(JP) ................................. 2021-088764

(51) Int. Cl.
*B60W 60/00* (2020.01)
*A63F 13/65* (2014.01)
(Continued)

(52) U.S. Cl.
CPC ....... *B60W 60/00136* (2020.02); *A63F 13/65* (2014.09); *A63F 13/803* (2014.09);
(Continued)

(58) Field of Classification Search
CPC ....... B60W 60/00136; B60W 2554/80; B60W 2556/65; B60W 2050/146;
(Continued)

(56) References Cited

U.S. PATENT DOCUMENTS

2018/0225963 A1* 8/2018 Kobayashi ............... G08G 1/09
2018/0315244 A1* 11/2018 Thompson ............. H04N 23/63
(Continued)

FOREIGN PATENT DOCUMENTS

JP　　2005069799 A　　3/2005
JP　　2012048748 A　 * 3/2012
(Continued)

OTHER PUBLICATIONS

Machine Translation of JP2012048748A (Year: 2012).*

*Primary Examiner* — Scott A Browne
*Assistant Examiner* — Jisun Choi
(74) *Attorney, Agent, or Firm* — Harness, Dickey & Pierce, PLC

(57) ABSTRACT

In a technique for controlling a first vehicle, display information and position specifying information are received from a second vehicle different from the first vehicle via inter-vehicle communications. The display information is information for display and independently set for the second vehicle in the second vehicle. The position specifying information is information for specifying a position of the second vehicle. The position of the second vehicle relative to the first vehicle is specified based on the position specifying information. Display on a display device is controlled to superimpose information indicated by the display information on the position of the second vehicle in a landscape in front of the first vehicle based on the position of the second vehicle and the display information.

3 Claims, 8 Drawing Sheets

(51) Int. Cl.

| | |
|---|---|
| *A63F 13/803* | (2014.01) |
| *A63F 13/87* | (2014.01) |
| *B60K 35/10* | (2024.01) |
| *B60K 35/22* | (2024.01) |
| *B60K 35/23* | (2024.01) |
| *B60K 35/28* | (2024.01) |
| *B60K 35/81* | (2024.01) |
| *G06T 11/00* | (2026.01) |

(52) U.S. Cl.
CPC .............. *A63F 13/87* (2014.09); *B60K 35/10* (2024.01); *B60K 35/22* (2024.01); *B60K 35/23* (2024.01); *B60K 35/28* (2024.01); *B60K 35/81* (2024.01); *G06T 11/00* (2013.01); *B60K 2360/177* (2024.01); *B60W 2554/80* (2020.02); *B60W 2556/65* (2020.02)

(58) Field of Classification Search
CPC ... B60W 2754/10; B60W 50/14; A63F 13/65; A63F 13/87; A63F 13/428; A63F 13/5372; B60K 35/00; B60K 35/28; B60K 35/81; B60K 2360/177; B60K 35/23; B60K 2360/5915; B60K 35/22
See application file for complete search history.

(56) References Cited

U.S. PATENT DOCUMENTS

| | | | |
|---|---|---|---|
| 2019/0333380 A1 | 10/2019 | Kobayashi et al. | |
| 2021/0192851 A1* | 6/2021 | Doptis .................... | A63F 13/65 |
| 2021/0209676 A1* | 7/2021 | Deol .................. | G02B 27/0093 |
| 2022/0347567 A1* | 11/2022 | Lake-Schaal .......... | H04W 4/46 |
| 2022/0351472 A1* | 11/2022 | Doptis ................. | A63F 13/213 |

FOREIGN PATENT DOCUMENTS

| | | |
|---|---|---|
| JP | 2019133260 A | 8/2019 |
| WO | WO-2017047176 A1 | 3/2017 |

* cited by examiner

VEHICLE CONTROL DEVICE AND VEHICLE CONTROL METHOD

CROSS REFERENCE TO RELATED APPLICATIONS

The present application is a continuation application of International Patent Application No. PCT/JP2022/020382 filed on May 16, 2022, which designated the U.S. and claims the benefit of priority from Japanese Patent Application No. 2021-088764 filed on May 26, 2021, and all the contents of the application are incorporated by reference.

TECHNICAL FIELD

The present disclosure relates to a vehicle control device and vehicle control method.

BACKGROUND

A technique for displaying multimedia information superimposed on another vehicle in an image displayed on a display of an subject vehicle is known.

SUMMARY

According to at least one embodiment of the present disclosure, a vehicle control technique is used in a first vehicle. Display information and position specifying information are received from a second vehicle different from the first vehicle via inter-vehicle communications. The display information is information for display and independently set for the second vehicle in the second vehicle. The position specifying information being information for specifying a position of the second vehicle. The position of the second vehicle relative to the first vehicle is specified based on the position specifying information. A display device is controlled to superimpose information indicated by the display information on the position of the second vehicle in a landscape in front of the first vehicle based on the position of the second vehicle and the display information.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
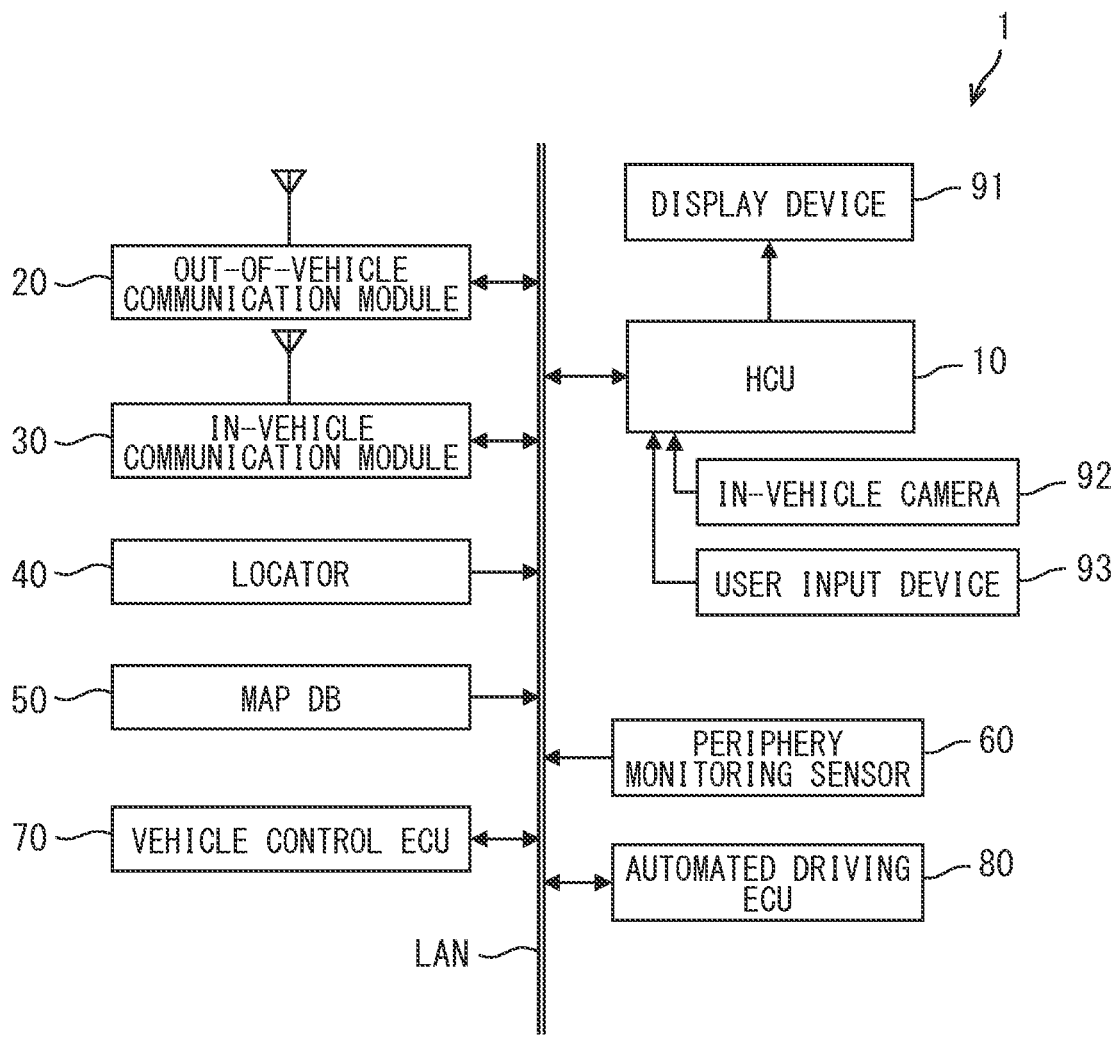
FIG. 1 is a schematic diagram illustrating a configuration of a vehicle system.

To begin with, examples of relevant techniques will be described. According to a comparative example, multimedia information is superimposed on another vehicle in an image displayed on a display of an subject vehicle. In a case where the multimedia information is a battle game, a player game medium associated with the subject vehicle and an opponent game medium associated with an external object are displayed to indicate a relative position between the subject vehicle and the external object in the multimedia information. In addition, the opponent game medium is set according to the type of the external object such as a truck, a passenger car, a motorcycle, or a pedestrian.

However, since the type of the opponent game medium is set according to only the type of the external object, it is difficult to identify another vehicle capable of communicating with the subject vehicle via communications. Therefore, even when a user on the subject vehicle wants to try to communicate with the other vehicle around the subject vehicle, the user cannot easily specify the other vehicle capable of communicating with the subject vehicle.

In contrast, according to the present disclosure, a user of a target vehicle can intuitively and easily specify a nearby vehicle capable of communicating with the target vehicle through inter-vehicle communications.

According to a first aspect of the present disclosure, a vehicle control device is configured to be used in a first vehicle. The vehicle control device includes a received information acquisition unit, an other vehicle position specifying unit, and a display control unit. The received information acquisition unit is configured to acquire display information and position specifying information which are received from a second vehicle different from the first vehicle via inter-vehicle communications. The display information is information for display and independently set for the second vehicle in the second vehicle. The position specifying information being information for specifying a position of the second vehicle. The other vehicle position specifying unit is configured to specify the position of the second vehicle relative to the first vehicle based on the position specifying information acquired by the received information acquisition unit. The display control unit is configured to control display on a display device configured to display an image to be superimposed on a landscape in front of the first vehicle. The display control unit is configured to superimpose information indicated by the display information on a position of the second vehicle in the landscape in front of the first vehicle based on the position of the second vehicle relative to the first vehicle specified by the other vehicle position specifying unit and the display information acquired by the received information acquisition unit.

According to a second aspect of the present disclosure, a vehicle control method is used in a first vehicle and executed by at least one processor. The method includes acquiring display information and position specifying information which are received from a second vehicle different from the first vehicle via inter-vehicle communications. The display information is information for display and independently set for the second vehicle in the second vehicle. The position specifying information being information for specifying a position of the second vehicle. The method includes specifying the position of the second vehicle relative to the first vehicle based on the position specifying information. The method includes controlling display on a display device configured to display an image to be superimposed on a landscape in front of the first vehicle. The controlling includes superimposing information indicated by the display information on a position of the second vehicle in the landscape in front of the first vehicle based on the position of the second vehicle relative to the first vehicle and the display information.

According to this configuration, the information indicated by the display information is displayed in a superimposed manner when the display information is acquired from the second vehicle capable of exchanging the display information with the first vehicle through the inter-vehicle communications. Therefore, since the information indicated by the display information is displayed in the superimposed manner, a user in the first vehicle can easily specify the second vehicle that can communicate with the first vehicle through the inter-vehicle communications. In addition, since the information indicated by the display information is displayed to be superimposed at the position of the second vehicle in the landscape in front of the first vehicle, the user can intuitively specify the second vehicle that can communicate with the first vehicle through the inter-vehicle communications. As a result, the user of the target vehicle (i.e., first vehicle) can intuitively and easily specify the nearby vehicle (i.e., second vehicle) that can communicate with the target vehicle through the inter-vehicle communications.

According to a third aspect of the present disclosure, a vehicle control device is configured to be used in a first vehicle. The vehicle control device includes a setting unit, a position specifying unit, and a transmission instruction unit. The setting unit is configured to set display information which is information about the first vehicle for display. The position specifying unit is configured to specify position specifying information which is information for specifying a position of the first vehicle. The transmission instruction unit is configured to cause transmission of information to a second vehicle different from the first vehicle via inter-vehicle communications. The transmission instruction unit is configured to cause transmission of the position specifying information specified by the position specifying unit and the display information set by the setting unit to the second vehicle. The second vehicle is a vehicle in which information indicated by the display information is displayed to be superimposed on a position of the first vehicle in a landscape in front of the second vehicle based on the display information and the position of the first vehicle specified from the position specifying information.

According to a fourth aspect of the present disclosure, a vehicle control method is used in a first vehicle and executed by at least one processor. The method includes setting display information which is information about the first vehicle for display. The method includes specifying position specifying information which is information for specifying a position of the first vehicle. The method includes causing transmission of information to a second vehicle different from the first vehicle via inter-vehicle communications. The causing includes causing transmission of the position specifying information and the setting display information to the second vehicle. The second vehicle is a vehicle in which information indicated by the setting display information is displayed to be superimposed on a position of the first vehicle in a landscape in front of the second vehicle based on the setting display information and the position of the first vehicle specified from the position specifying information.

According to this configuration, the information indicated by the acquired display information is displayed in a superimposed manner in the second vehicle that can communicate with the first vehicle through the inter-vehicle communications. Therefore, since the information indicated by the display information is displayed in the superimposed manner, a user of the second vehicle can easily specify the first vehicle that can communicate with the second vehicle by the inter-vehicle communications in the second vehicle. In addition, the information for specifying the position of the first vehicle is also transmitted to the second vehicle, and the information indicated by the display information is displayed to be superimposed on the position of the first vehicle in the landscape in front of the second vehicle. Therefore, the user of the second vehicle can intuitively identify the first vehicle that can communicate with the second vehicle by the inter-vehicle communications in the second vehicle. As a result, the user of the target vehicle (i.e., second vehicle) can intuitively and easily specify the nearby vehicle (i.e., first vehicle) that can communicate with the target vehicle through the inter-vehicle communications.

Multiple embodiments will be described with reference to the drawings. For convenience of explanation, portions having the same functions as those illustrated in the drawings used in the description among embodiments are assigned the same reference symbol, and descriptions of the same portions may be omitted. Descriptions in another embodiment may be referred to for the portions assigned the same reference symbol.

First Embodiment

Hereinafter, a first embodiment of the present disclosure will be described with reference to the drawings. A vehicle system 1 shown in FIG. 1 can be used for a vehicle configured to execute automated driving. Hereinafter, the vehicle may be referred to as an automated driving vehicle. As shown in FIG. 1, the vehicle system 1 includes an HCU (Human Machine Interface Control Unit) 10, an out-of-vehicle communication module 20, an in-vehicle communication module 30, a locator 40, a map database (hereinafter, referred to as a map DB) 50, a periphery monitoring sensor 60, a vehicle control ECU 70, an automated driving ECU 80, a display device 91, an in-vehicle camera 92, and a user input device 93. For example, the HCU 10, the out-of-vehicle communication module 20, the in-vehicle communication module 30, the locator 40, the map DB 50, the periphery monitoring sensor 60, the vehicle control ECU 70, and the automated driving ECU 80 may be connected to an in-vehicle LAN (see "LAN" in FIG. 1). Although the vehicle including the vehicle system 1 is not necessarily limited to an automobile, a case where the vehicle system 1 is used in an automobile will be described below as an example.

The degree of the automated driving (hereinafter, referred to as an automation level) of the automated driving vehicle includes multiple levels as defined by, for example, SAE. This automation level is classified into, for example, five levels including LV0 to LV5 as follows.

LV0 is a level where a driver performs all driving tasks without intervention of the system. The driving task may be rephrased as a dynamic driving task. The driving task includes, for example, steering, acceleration/deceleration, and periphery monitoring. LV 0 corresponds to so-called manual driving. LV 1 is a level where the system assists steering or acceleration/deceleration. LV 1 corresponds to so-called driving assistance. LV 2 is a level where the system assists both steering and acceleration/deceleration. LV 2 corresponds to so-called partial driving automation. LVs 1 and 2 are a part of the automated driving.

For example, the automated driving at LVs 1 and 2 is automated driving in which a driver has an obligation of monitoring related to safe driving. Hereinafter, the obligation is simply referred to as a monitoring obligation. The monitoring obligation includes visual monitoring of the periphery. The automated driving at LVs 1 and 2 is, in other words, automated driving in which a second task is not permitted. The second task is an action permitted to the driver other than a driving operation, and is a predetermined specific action. The second task can also be rephrased as a secondary activity, another activity, or the like. The second task should not prevent the driver from responding to a request to take over a driving operation from the automated driving system. As an example, actions such as viewing of content such as a moving image, operation of an online game, operation of a smartphone or the like, reading, and eating are assumed as the second task.

LV 3 of the automated driving is a level where the system executes all driving tasks under certain conditions, and the driver performs the driving operation in case of emergency. In LV 3 of the automated driving, the driver is required to be able to respond quickly when the system requests to take over the driving operation. This takeover of the driving can also be rephrased as transfer of the monitoring obligation from the system of the vehicle to the driver. LV 3 corresponds to a conditional driving autonomation.

LV 4 of the automated driving is a level where the system is capable of executing all driving tasks, except under a specific circumstance, such as an unexpected road condition, an extreme environment, and the like. LV 4 corresponds to a high driving automation. LV 5 of the automated driving is a level in which the system is capable of executing all driving tasks in any situation. LV 5 corresponds to a full driving automation.

For example, the automated driving at LVs 3 to 5 is an automated driving in which the driver does not have the monitoring obligation. In other words, the automated driving corresponds to automated driving without the monitoring obligation. The automated driving at LVs 3 to 5 is, in other words, automated driving in which the second task is permitted.

The automated driving vehicle of the present embodiment is capable of switching the automation level. The automation level may be switchable only between some levels of the LVs 0 to 5. In the present embodiment, an example will be described in which the automated driving vehicle can be switched between the automated driving at the LV 3 (i.e., automated driving without the monitoring obligation), the automated driving at the LV 2 or lower, and the manual driving at the LV 0.

The out-of-vehicle communication module 20 transmits and receives information to and from at least another vehicle via wireless communications. In other words, the out-of-vehicle communication module 20 executes inter-vehicle communications. Further, the out-of-vehicle communication module 20 may transmit and receive information to and from a center outside the subject vehicle via wireless communications. In other words, the out-of-vehicle communication module 20 may execute wide area communications. The out-of-vehicle communication module 20 may transmit and receive information to and from a roadside device installed on a roadside via wireless communications. In other words, the out-of-vehicle communication module 20 may execute road-to-vehicle communications.

The in-vehicle communication module 30 executes short-range wireless communications. When a communication connection is established between the in-vehicle communication module 30 and a mobile terminal of an occupant of the subject vehicle, the in-vehicle communication module 30 executes short-range wireless communications with the mobile terminal. The short-range wireless communications is, for example, wireless communications in which a communication range is about several meters to several tens of meters at the maximum. In the present embodiment, a case where the short-range wireless communications is executed between the mobile terminal of the driver and the in-vehicle communication module 30 will be described as an example. The short-range wireless communications may be, for example, wireless communications conforming to Bluetooth (registered trademark) Low Energy. Examples of the mobile terminal of the driver include a multifunctional mobile phone.

The locator 40 includes a GNSS (Global Navigation Satellite System) receiver and an inertial sensor. The GNSS receiver is configured to receive positioning signals from multiple positioning satellites. The inertial sensor includes a gyro sensor and an acceleration sensor, for example. The locator 40 combines the positioning signals received by the GNSS receiver with the measurement results of the inertial sensor to sequentially detect the position of the subject vehicle (hereinafter, vehicle position) on which the locator 40 is mounted. The vehicle position may be represented by, for example, coordinates of latitude and longitude. The vehicle position may be measured based on also a travel distance obtained from signals sequentially output from a vehicle speed sensor mounted in the vehicle.

The map DB 50 is a non-volatile memory and stores high-precision map data. The high-precision map data is map data with higher precision than the map data used for route guidance in a navigation function. The map DB 50 may also store map data used for route guidance. The high-precision map data includes information that can be used for the automated driving operation, such as three-dimensional road shape information, information on the number of lanes, and information indicating the direction of travel for each lane. In addition, the high-precision map data may also include, for example, a node point information indicating the positions of both ends of a road marking such as a lane marking. The locator 40 may be configured not to use the GNSS receiver by using the three-dimensional shape information of the road. For example, the locator 40 may determine the vehicle position by using the three-dimensional shape information of the road and a detection result of the periphery monitoring sensor 60 such as a periphery monitoring camera or a LiDAR (Light Detection and Ranging/Laser Imaging Detection and Ranging) that detects feature points of the road shape and the structure. The three-dimensional shape information of the road may be generated based on a captured image by REM (Road Experience Management).

The out-of-vehicle communication module 20 may receive map data distributed from an external server through, for example, wide area communications and may store the data in the map DB 50. In this case, the map DB 50 may be a volatile memory, and the out-of-vehicle communication module 20 may sequentially acquire the map data of an area corresponding to the vehicle position.

The periphery monitoring sensor 60 monitors a surrounding environment of the subject vehicle. For example, the periphery monitoring sensor 60 detects obstacles around the subject vehicle such as moving objects such as pedestrians and other vehicles, and stationary objects such as fallen objects on the road. In addition, a road marking such as a traveling lane marking around the subject vehicle is detected. The periphery monitoring sensor 60 is a sensor such as a surrounding monitoring camera that captures a predetermined range around the subject vehicle, a millimeter wave radar that transmits a search wave in a predetermined range around the subject vehicle, a sonar, or a LiDAR. The surrounding monitoring camera sequentially outputs, as sensing information, sequentially captured images to the automated driving ECU 80. A sensor that transmits a probe wave, such as the sonar, the millimeter wave radar or the LiDAR, sequentially outputs the sensing information to the automated driving ECU 80, and the sensing information is a scanning result based on a received signal acquired as a wave reflected from an obstacle on the road. The sensing information detected by the periphery monitoring sensor 60 may be outputted to the in-vehicle LAN via the automated driving ECU 80.

The vehicle control ECU 70 is an electronic control unit configured to execute a traveling control of the subject vehicle. The traveling control includes an acceleration/deceleration control and/or a steering control. The vehicle control ECU 70 includes a steering ECU that executes the steering control, a power unit control ECU and a brake ECU that execute the acceleration/deceleration control. The vehicle control ECU 70 is configured to output a control signal to a traveling control device such as an electronic throttle, a brake actuator, and an EPS (Electric Power Steering) motor mounted on the subject vehicle, thereby performing the traveling control.

The automated driving ECU 80 includes a processor, a memory, an I/O, and a bus that connects those devices, and executes a control program stored in the memory, thereby executing a process related to the automated driving operation. The memory is a non-transitory tangible storage medium, and stores programs and data readable by a computer. The non-transitory tangible storage medium may be provided by a semiconductor memory or a magnetic disk, for example.

The automated driving ECU 80 controls the vehicle control ECU 70 to execute an automated driving function to execute a driving operation on behalf of a person. The automated driving ECU 80 recognizes a traveling environment of the subject vehicle from the vehicle position measured by the locator 40, the map data acquired from the map DB 50, and the sensing information by the periphery monitoring sensor 60. For example, the automated driving ECU 80 generates a virtual space in which an actual traveling environment is reproduced in three dimensions. The automated driving ECU 80 generates a travel plan for causing the subject vehicle to automatically travel by the automated driving function on the basis of the recognized travel environment. As a travel plan, a long and medium term travel plan and a short term travel plan are generated. In the long and medium term travel plan, a travel route for causing the subject vehicle to travel to a set destination is defined. In the short-term travel plan, the generated virtual space around the subject vehicle is used to define a planned travel trajectory for realizing travel according to the long-to-medium term travel plan. For example, steering for lane keeping and lane change, acceleration/deceleration for speed adjustment, stopping at a stop position, departure from the stop position, braking and steering for avoiding an obstacle, are determined based on the short-term travel plan.

The display device 91 presents information to the driver of the subject vehicle by displaying the information. The display device 91 executes display in accordance with an instruction from the HCU 10. The display device 91 has a display screen located on the front side of a driver's seat. For example, the display device 91 may have the display screen located on a front windshield of the subject vehicle. Accordingly, the display device 91 superimposes and displays an image on the landscape in front of the subject vehicle. Examples of the display device 91 include a head-up display (HUD) and a transmissive display provided on the front windshield. The HUD is provided, for example, on an instrument panel in a vehicle cabin of the vehicle. The HUD projects a display image formed by a projector onto a projection region defined on the front windshield serving as a projection member. The light of the display image reflected toward an inside of the vehicle cabin by the front windshield is perceived by an occupant (that is, the driver) sitting on the driver's seat. As a result, the driver can visually recognize a virtual image of the display image formed in front of the front windshield so as to overlap with a part of the landscape in front of the vehicle. The HUD may be configured to project the display image onto a combiner provided in front of the driver's seat instead of the front windshield.

The subject vehicle may be provided with a display device other than the display device 91. For example, a display device such as a combination meter or a CID (Center Information Display) may be provided in the subject vehicle. The combination meter and the CID present information via a liquid crystal display, for example. The combination meter is disposed on an instrument panel in front of the driver's seat. The CID is located above a center cluster.

The in-vehicle camera 92 captures an image of the interior of the subject vehicle. For example, the in-vehicle camera 92 may include a near-infrared light source, a near-infrared camera, and a control unit that controls the near-infrared light source and the near-infrared camera. The in-vehicle camera 92 is disposed, for example, on an upper surface of the instrument panel in an orientation in which the near-infrared camera faces the driver's seat side of the subject vehicle. The in-vehicle camera 92 captures an image of the driver irradiated with near-infrared light by the near-infrared light source with the near-infrared camera. The imaging range may be set to include at least the head of the driver. An image captured by the near-infrared camera is image-analyzed by the control unit. The control unit detects the position of eyes and a line-of-sight direction of the driver based on the feature amount of the driver extracted via analysis of the captured image.

The user input device 93 accepts input from the user. The user input device 93 may be an operation device that receives operation input from the user. The operation device may be a mechanical switch or a touch switch integrated with a display device such as the CID described above. The user input device 93 is not limited to the operation device that accepts the operation input as long as the user input device 93 is a device that accepts input from the user. For example, the user input device 93 may be an audio input device that receives command input by an audio such as a voice from the user.

The HCU 10 mainly includes a computer including a processor, a volatile memory, a nonvolatile memory, an I/O, and a bus connecting these devices. The HCU 10 is connected to the display device 91, the in-vehicle camera 92, the user input device 93, and the in-vehicle LAN. The HCU 10 controls display on the display device 91 by executing a control program stored in the nonvolatile memory. The HCU 10 corresponds to a vehicle control device. In the present embodiment, a case where the HCU 10 is used in a vehicle capable of executing at least automated driving without the monitoring obligation as automated driving will be described as an example. The configuration of the HCU 10 related to control of display on the display device 91 will be described in detail below.

Figure 2:
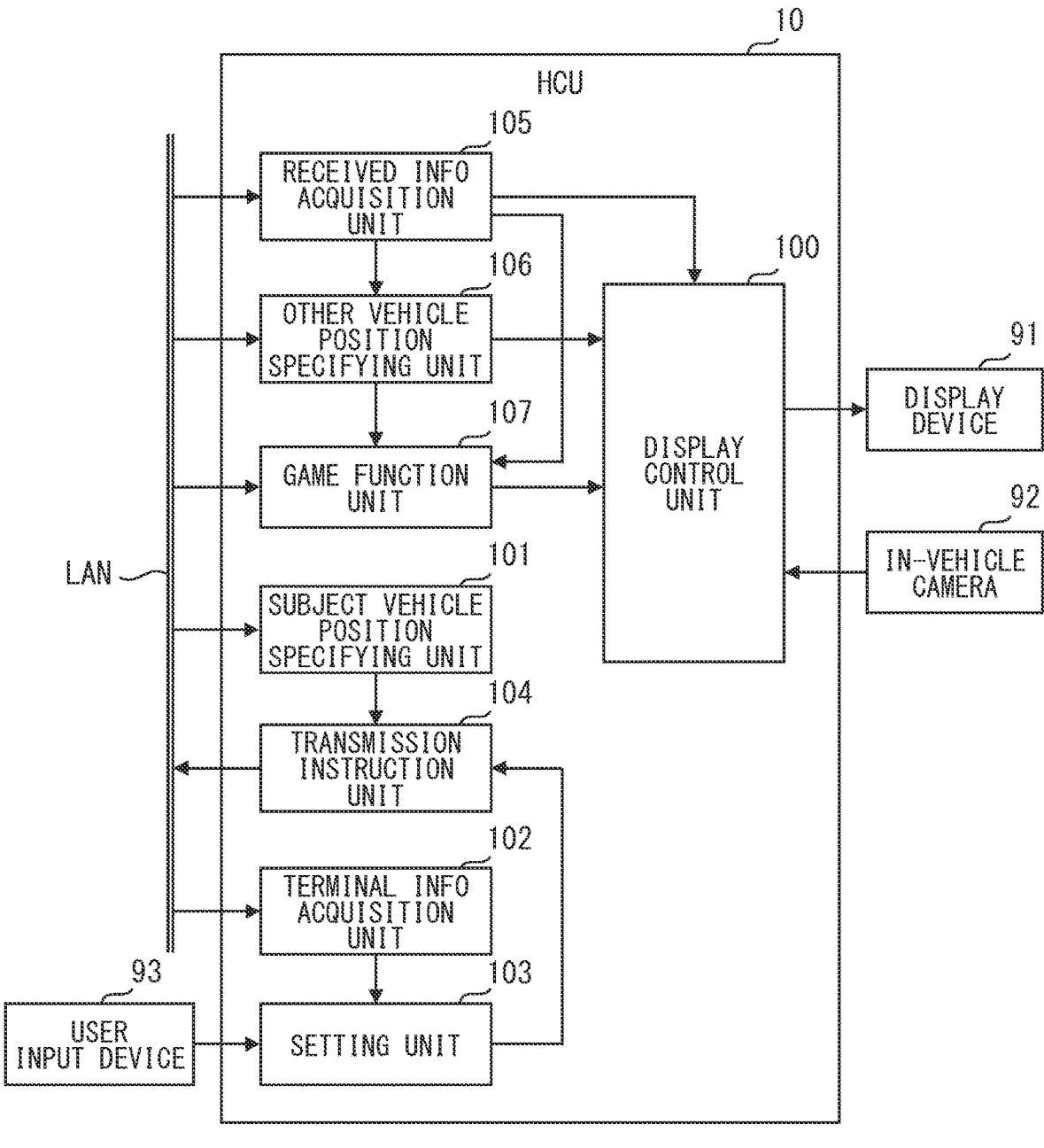
FIG. 2 is a schematic diagram illustrating an example of a configuration of an HCU.

A schematic configuration of the HCU 10 will be described with reference to FIG. 2. As shown in FIG. 2, regarding a control of display on the display device 91, the HCU 10 includes a display control unit 100, a subject vehicle position specifying unit 101, a terminal information acquisition unit 102, a setting unit 103, a transmission instruction unit 104, a received information acquisition unit 105, an other vehicle position specifying unit 106, and a game function unit 107 as functional blocks. Execution of a process of each functional block of the HCU 10 by the computer corresponds to execution of a vehicle control method. Some or all of the functions executed by the HCU 10 may be implemented by hardware including one or more ICs. Alternatively, some or all of the functions executed by the HCU 10 may be implemented by a combination of execution of software by the processor and a hardware device.

The subject vehicle position specifying unit 101 specifies information (hereinafter, position specifying information) for specifying the position of the subject vehicle. The subject vehicle position specifying unit 101 corresponds to a position specifying unit. The process in the subject vehicle position specifying unit 101 corresponds to a position specifying step. The subject vehicle position specifying unit 101 may specify the vehicle position measured by the locator 40 as the position specifying information. The terminal information acquisition unit 102 acquires, via the in-vehicle communication module 30, information of a mobile terminal connected to the in-vehicle communication module 30 by the short-range wireless communications.

The setting unit 103 sets display information (hereinafter, setting display information) about the subject vehicle. The processing in the setting unit 103 corresponds to a setting step. The setting unit 103 may set, as the setting display information, information for displaying an image (hereinafter, pseudo image) virtually representing the subject vehicle or an occupant of the subject vehicle. The information for displaying the pseudo image is hereinafter referred to as DPI information. Examples of the pseudo image include an avatar imitating a character, and an icon, for example. The pseudo image may be set in accordance with an input from the user received by the user input device 93. For example, the pseudo image may be set by selecting one pseudo image from multiple types of pseudo images prepared in advance. The pseudo image may be set by the setting unit 103 acquiring the pseudo image selected in the mobile terminal of the user via the terminal information acquisition unit 102. The setting unit 103 may store the set pseudo image in the nonvolatile memory of the HCU 10 until a new pseudo image is set again. Therefore, the time and effort for setting the pseudo image each time the subject vehicle is used can be reduced.

The setting unit 103 may set information for displaying text (hereinafter, referred to as message text) representing a message as the setting display information. The information for displaying the message text is hereinafter referred to as DMT information. The message text may be a text representing a message of content that the driver of the subject vehicle wants to convey to the occupant of the other vehicle. The message text may be set in accordance with an input from the user received by the user input device 93. For example, the message text may be set by selecting one of multiple types of message texts prepared in advance. In addition, the content obtained by converting content uttered by the user into text via a voice input device may be set as the message text. The message text may be set by the setting unit 103 acquiring, via the terminal information acquisition unit 102, the message text selected or input by voice in the mobile terminal of the user.

The transmission instruction unit 104 causes the out-of-vehicle communication module 20 to transmit information via inter-vehicle communications to another vehicle other than the subject vehicle. The processing in the transmission instruction unit 104 corresponds to a transmission instruction step. The transmission instruction unit 104 transmits the position specifying information specified by the subject vehicle position specifying unit 101 and the setting display information set by the setting unit 103 to the other vehicle including a vehicle system 1. The transmission instruction unit 104 transmits the position specifying information and the setting display information to the out-of-vehicle communication module 20, and causes the out-of-vehicle communication module 20 to transmit the position specifying information and the setting display information to the other vehicle through the inter-vehicle communications. In the out-of-vehicle communication module 20, at the time of transmitting the position specifying information and the setting display information via the inter-vehicle communications, identification information by which a transmission source can be specified may also be transmitted. For example, an account unique to the user of the out-of-vehicle communication module 20 or an ID unique to the out-of-vehicle communication module 20 may be used as the identification information.

When the DPI information is transmitted as the setting display information via the inter-vehicle communications, the transmission instruction unit 104 may not retransmit the DPI information until the communication connection of the inter-vehicle communications is released. According to this, unnecessary transmissions of the same DPI information via the communication connection of the inter-vehicle communications can be reduced. When the DMT information is transmitted as the setting display information via the inter-vehicle communications, the transmission instruction unit 104 may transmit the DMT information via the inter-vehicle communications each time the setting unit 103 sets the message text. The transmission instruction unit 104 may sequentially transmit the position specifying information via the communication connection of the inter-vehicle communications even at a timing other than the timing to transmit the setting display information.

The received information acquisition unit 105 acquires information received by the out-of-vehicle communication module 20 via inter-vehicle communications from another vehicle that is a vehicle other than the subject vehicle and includes a vehicle system 1. The received information includes the setting display information set independently for the other vehicle by the HCU 10 of the other vehicle, and the position specifying information of the other vehicle. The process in the received information acquisition unit 105 corresponds to a received information acquisition step.

The other vehicle position specifying unit 106 specifies a position (hereinafter, referred to as other vehicle position) of the other vehicle relative to the subject vehicle based on the position specifying information of the other vehicle acquired by the received information acquisition unit 105. The process in the other vehicle position specifying unit 106 corresponds to the other vehicle position specifying step. The other vehicle position specifying unit 106 specifies the other vehicle position based on the vehicle position of the subject vehicle measured by the locator 40 and the other vehicle position that is the position specifying information of the other vehicle.

The game function unit 107 executes a game application using at least the positions of the subject vehicle and the other vehicle. This game is assumed to be an online game played between the subject vehicle and the other vehicle through the inter-vehicle communications executed by the out-of-vehicle communication module 20. That is, the game is an online game (hereinafter, simply referred to as online game) in which an image is displayed to be superimposed on the landscape in front of the subject vehicle. The display screen of the display device 91 is used for the online game. Examples of the online game include a racing game in which an actual vehicle under vehicle control by automated driving is used. In such racing game, for example, the user input device 93 may be used as a controller, and a race may be held by operating the actual vehicle under vehicle control by automated driving without the actual vehicle coming too close to obstacles including surrounding vehicles. The online game caused by the game function unit 107 executing the application may not be the racing game and may be an online game in which the other vehicle is regarded as an opponent. For example, the game may be a battle action game, a battle puzzle game, or a shooting game, for example.

The display control unit 100 controls display on the display device 91. The process in the display control unit 100 corresponds to a display control step. The display control unit 100 controls the display device 91 based on the other vehicle position specified by the other vehicle position specifying unit 106 and the setting display information acquired by the received information acquisition unit 105, and displays the information indicated by the setting display information to be superimposed on the position of the other vehicle in the landscape in front of the subject vehicle. When the setting display information is the DPI information, the display control unit 100 causes the display device 91 to display the pseudo image to be superimposed on the position of the other vehicle in the landscape in front of the subject vehicle. That is, a pseudo image such as an avatar or an icon set in the other vehicle is displayed to be superimposed at the position of the other vehicle in the landscape in front of the subject vehicle. When the setting display information is the DMT information, the display control unit 100 causes the display device 91 to display the message text to be superimposed on the position of the other vehicle in the landscape in front of the subject vehicle. That is, the message text set in the other vehicle is displayed to be superimposed at the position of the other vehicle in the landscape in front of the subject vehicle.

The display control unit 100 may display the information indicated by the setting display information to be superimposed at the position of the other vehicle in the landscape in front of the subject vehicle based on an average position of eyes of a driver in the driver's seat set in advance. The display control unit 100 may display the information indicated by the setting display information to be superimposed at the position of the other vehicle in the landscape in front of the subject vehicle with higher accuracy by using the position of the eyes and the line-of-sight direction of the driver sequentially detected by the in-vehicle camera 92.

When the subject vehicle is being controlled under automated driving without the monitoring obligation and the online game is being played using an image displayed to be superimposed on the landscape in front of the subject vehicle between the subject vehicle and the other vehicle through the inter-vehicle communications, the display control unit 100 may display a pseudo image set for the other vehicle in the other vehicle to be superimposed at the position of the other vehicle which is a partner of the online game in the landscape in front of the subject vehicle. According to this, the driver of the subject vehicle can enjoy the online game while perceiving as if the character represented by the pseudo image is actually running on the road. In this case, the display control unit 100 may display the pseudo image set for the other vehicle in the other vehicle such that the pseudo image is superimposed at the position of the other vehicle as the partner of the online game in the landscape in front of the subject vehicle, on the basis of the other vehicle position of the other vehicle as the partner of the online game specified by the other vehicle position specifying unit 106 and the DPI information acquired by the received information acquisition unit 105. The received information acquisition unit 105 acquires the DPI information before the application of the online game is started.

Figure 3:
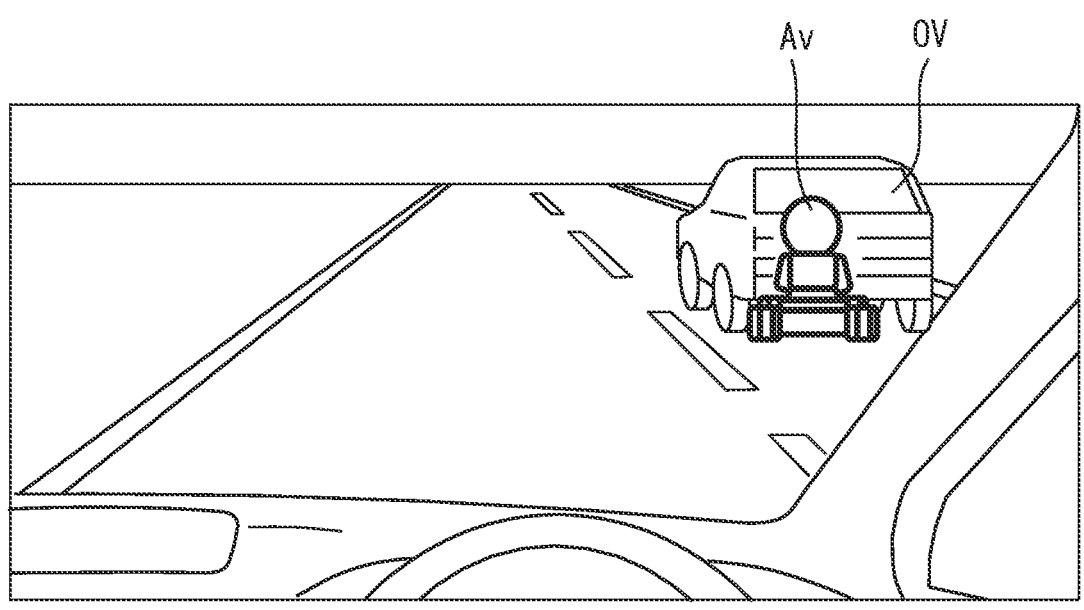
FIG. 3 is a diagram illustrating a display example of a pseudo image.

Here, a display example of the pseudo image will be described with reference to FIG. 3. "OV" in FIG. 3 indicates another vehicle in the landscape in front of the subject vehicle. It is assumed that the other vehicle OV is a partner of the subject vehicle in the online game. "Av" in FIG. 3 indicates a pseudo image set in the other vehicle OV. In the example illustrated in FIG. 3, an avatar of a person on a cart is used as the pseudo image. As illustrated in FIG. 3, the pseudo image Av is displayed to be superimposed at the position of the other vehicle OV in the landscape in front of the subject vehicle.

The selection of the other vehicle as the partner in the online game may be selectable from identification information such as an account acquired from the other vehicle that is capable of communicating with the subject vehicle via the inter-vehicle communications using the out-of-vehicle communication module 20. For example, a list of accounts of other vehicles with which the subject vehicle can communicate via the inter-vehicle communications may be displayed, and an account of another vehicle may be selected as an opponent from the list using the user input device 93. The inter-vehicle communications used for the online game may be unicast communications.

After the pseudo image is once displayed to be superimposed at the position of the other vehicle in the landscape in front of the subject vehicle, the other vehicle position specifying unit 106 may sequentially specify the position of the other vehicle detected by the periphery monitoring sensor 60 as the other vehicle position. Then, the display control unit 100 may continuously display the pseudo image to be superimposed on the position of the other vehicle by sequentially tracking the position of the other vehicle in the landscape in front of the subject vehicle based on the other vehicle position sequentially specified in the above-described manner using the periphery monitoring sensor 60. The other vehicle position specifying unit 106 may associate the other vehicle, which is the partner of the inter-vehicle communications, with the other vehicle detected by the periphery monitoring sensor 60 by approximation of a position, a speed, and a traveling direction, for example. The other vehicle position specifying unit 106 may specify the position of the other vehicle detected by the periphery monitoring sensor 60 as the other vehicle position based on the traveling environment recognized by the automated driving ECU 80.

When the pseudo image is displayed to be superimposed at the position of the other vehicle in the landscape in front of the subject vehicle and the DMT information is also acquired by the received information acquisition unit 105, the display control unit 100 may display the message text in a display mode in which the pseudo image utters the message content of the message text. That is, when the application of the online game is being executed, the message text may be displayed in a display mode in which the pseudo image displayed to be superimposed at the position of the other vehicle that is the partner in the online game utters the message content of the message text. For example, an image of a balloon may be displayed to be superimposed on the pseudo image such as an avatar or an icon, and a message text may be displayed within the image of the balloon so that the pseudo image appears to be uttering.

Figure 4:
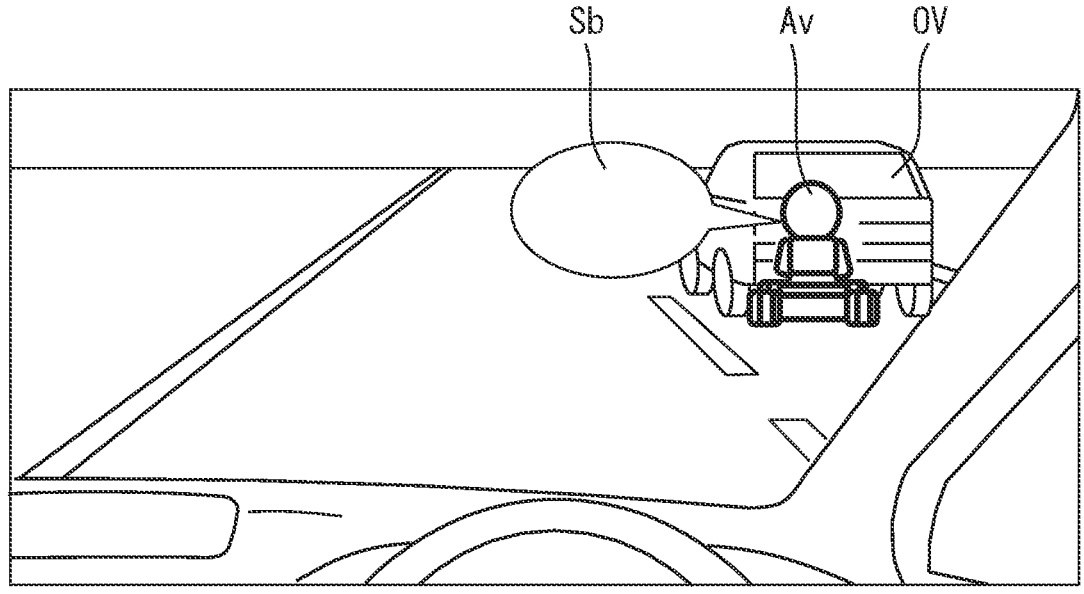
FIG. 4 is a diagram illustrating a display example of a message text.

Here, a display example of the message text will be described with reference to FIG. 4. The example of FIG. 4 is the same as the example shown in FIG. 3 except that the balloon image Sb is included. As illustrated in FIG. 4, the balloon image Sb is displayed as if the pseudo image Av superimposed at the position of the other vehicle OV in the landscape in front of the subject vehicle is uttering. Then, the message text is displayed in the image Sb of the balloon.

Here, with reference to the flowchart of FIG. 5, an example of a flow of a process (hereinafter, referred to as a process related to a superimposed display control) related to control of superimposed display of information indicated by setting display information in the HCU 10 will be described. The process shown in FIG. 5 may be, for example, started when switch for starting an internal combustion engine or a motor generator of the subject vehicle is turned on. The switch for starting the vehicle is also referred to as a power switch.

First, in step S1, when the automation level of the subject vehicle is determined to be equal to or higher than LV3 (YES in S1), the process proceeds to step S2. That is, when the subject vehicle is being controlled under the automated driving without the monitoring obligation, the process proceeds to step S2. On the other hand, when the automation level of the subject vehicle is determined to be equal to or lower than LV2 (NO in S1), the process proceeds to step S10. That is, when the subject vehicle is not being controlled under the automated driving without the monitoring obligation, the process proceeds to step S10.

In step S2, when the inter-vehicle communications with another vehicle via the out-of-vehicle communication module 20 of the subject vehicle is determined to have been executed (YES in S2), the process proceeds to step S3. On the other hand, when the inter-vehicle communications with the other vehicle is determined not to have been executed (NO in S2), the process proceeds to step S10.

In step S3, the received information acquisition unit 105 acquires the DPI information received by the out-of-vehicle communication module 20 from the other vehicle through the inter-vehicle communications. In step S3, in addition to the DPI information, the position specifying information of the other vehicle received by the out-of-vehicle communication module 20 from the other vehicle through the inter-vehicle communications may be acquired.

In step S4, when the game function unit 107 is determined to have started the online game (hereinafter, referred to as OG) with the other vehicle (YES in S4), the process proceeds to step S5. On the other hand, when the OG is determined not to have been started (NO in S4), the process proceeds to step S10. The OG may be started when the user input device 93 receives an input indicating an instruction to start the OG.

In step S5, the other vehicle position specifying unit 106 specifies the other vehicle position of the other vehicle based on the position specifying information of the other vehicle as the OG opponent acquired by the received information acquisition unit 105. The process of S5 may be executed before the process of S4. In step S5, after the pseudo image is once displayed to be superimposed at the position of the other vehicle in the landscape in front of the subject vehicle in step S6 described later, the position of the other vehicle detected by the periphery monitoring sensor 60 is sequentially specified as the other vehicle position.

In step S6, based on the DPI information acquired in step S3 and the other vehicle position specified in step S5, the display control unit 100 displays the pseudo image set for the other vehicle in the other vehicle such that the pseudo image is superimposed at the position of the other vehicle that is the OG opponent in the landscape in front of the subject vehicle.

In step S7, when the received information acquisition unit 105 is determined to have acquired the DMT information received by the out-of-vehicle communication module 20 from the other vehicle through the inter-vehicle communications (YES in S7), the process proceeds to step S8. That is, when the DMT information has been transmitted from the other vehicle by the inter-vehicle communications, the process proceeds to step S8. On the other hand, when the received information acquisition unit 105 is determined not to have acquired the DMT information (NO in S7), the process proceeds to step S9. That is, when the DMT information has not been transmitted from the other vehicle by the inter-vehicle communications, the process proceeds to step S9.

In step S8, based on the DMT information acquired in step S7 and the other vehicle position specified in step S5, the display control unit 100 displays the message text at or around the display position of the pseudo image in the landscape in front of the subject vehicle in the display mode in which the pseudo image utters the message content of the message text. As an example, a balloon image is superimposed on the pseudo image such as an avatar or an icon, and the message text is displayed in the balloon image.

In step S9, when the OG is determined to be ended (YES in S9), the process proceeds to step S10. On the other hand, when the OG is determined not to be ended (NO in S9), the process returns to S5 and the processes in steps S5 to S9 are repeated. In step S10, when it is determined to be the end timing of the process related to the superimposed display control (YES in step S10), the process related to the superimposed display control is ended. On the other hand, when it is determined not to be the end timing of the process related to the superimposed display control (NO in S10), the process returns to S1 and is repeated. An example of the end timing of the process related to the superimposed display control includes turning-off of the power switch.

Figure 5:
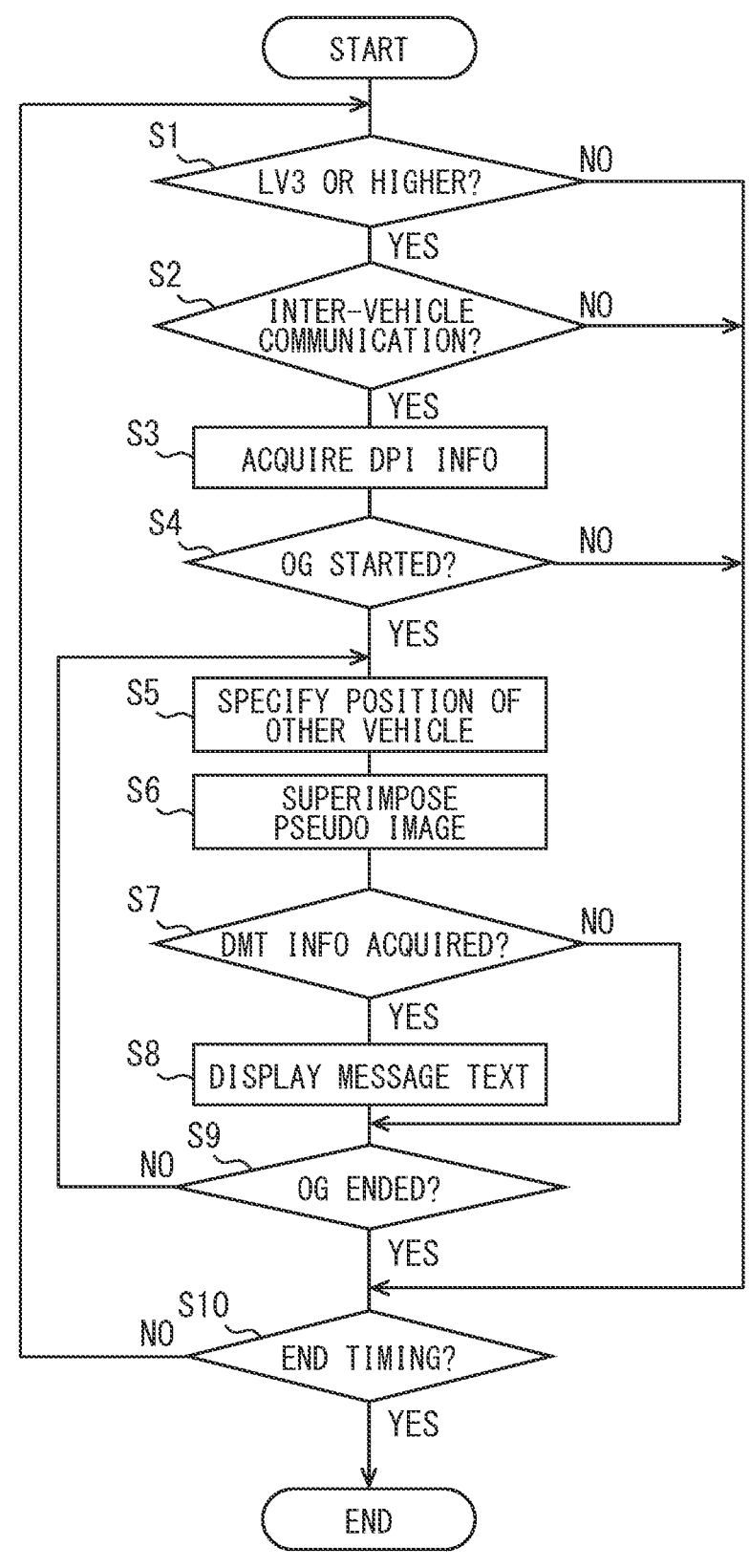
FIG. 5 is a flowchart illustrating an example of a flow of a process related to a superimposed display control in the HCU.

In the example of FIG. 5, the pseudo image is displayed to be superimposed at the position of the other vehicle in the landscape in front of the subject vehicle only for the other vehicle that is the opponent in the OG, but the present disclosure is not necessarily limited thereto. For example, in the driving of LV2 or lower in which the OG is not played, the pseudo image and the message text may be superimposed at the position of the other vehicle in the landscape in front of the subject vehicle regarding the other vehicle from which the DPI information and the DMT information can be acquired through the inter-vehicle communications. In this case, the inter-vehicle communications may be broadcast communications. When the DPI information and the DMT information can be acquired from multiple other vehicles, the pseudo image and the message text for each of the other vehicles may be displayed to be superimposed at the respective positions of the other vehicles.

According to the configuration of the first embodiment, the superimposed display of the pseudo image and the message text is executed in a case where the DPI information and the DMT information are acquired from another vehicle that can communicate with the subject vehicle through the inter-vehicle communications. Therefore, since the pseudo image and the message text are displayed in a superimposed manner, the user can easily specify the other vehicle that can communicate with the subject vehicle through the inter-vehicle communications. In addition, since the pseudo image and the message text are displayed to be superimposed at the position of the other vehicle in the landscape in front of the vehicle, the user can intuitively specify the other vehicle that can communicate with the subject vehicle through the inter-vehicle communications. As a result, the user of the target vehicle (i.e., subject vehicle) can intuitively and easily specify a nearby vehicle (i.e., other vehicle) that can communicate with the target vehicle through the inter-vehicle communications.

According to the configuration of the first embodiment, superimposed display of the pseudo image and the message text indicated by the acquired DPI information and DMT information is executed also in the other vehicle that can communicate with the subject vehicle through the inter-vehicle communications. Therefore, since the pseudo image and the message text are superimposed and displayed, a user of the other vehicle can easily specify the subject vehicle that can communicate with the other vehicle by the inter-vehicle communications in the other vehicle. In addition, the information for specifying the position of the subject vehicle is also transmitted to the other vehicle, and the pseudo image and the message text are displayed to be superimposed at the position of the subject vehicle in the landscape in front of the other vehicle. Therefore, the user of the other vehicle can intuitively identify the subject vehicle that can communicate with the other vehicle by the inter-vehicle communications in the other vehicle. As a result, the user of the target vehicle (i.e., other vehicle) can intuitively and easily specify the nearby vehicle (i.e., subject vehicle) that can communicate with the target vehicle through the inter-vehicle communications.

Second Embodiment

In addition to the first embodiment, a configuration as in a following second embodiment may be employed. Hereinafter, an example of the second embodiment will be described with reference to the drawings. The vehicle system 1 of the second embodiment is similar to the vehicle system 1 of the first embodiment, except for including an HCU 10a instead of the HCU 10.

Figure 6:
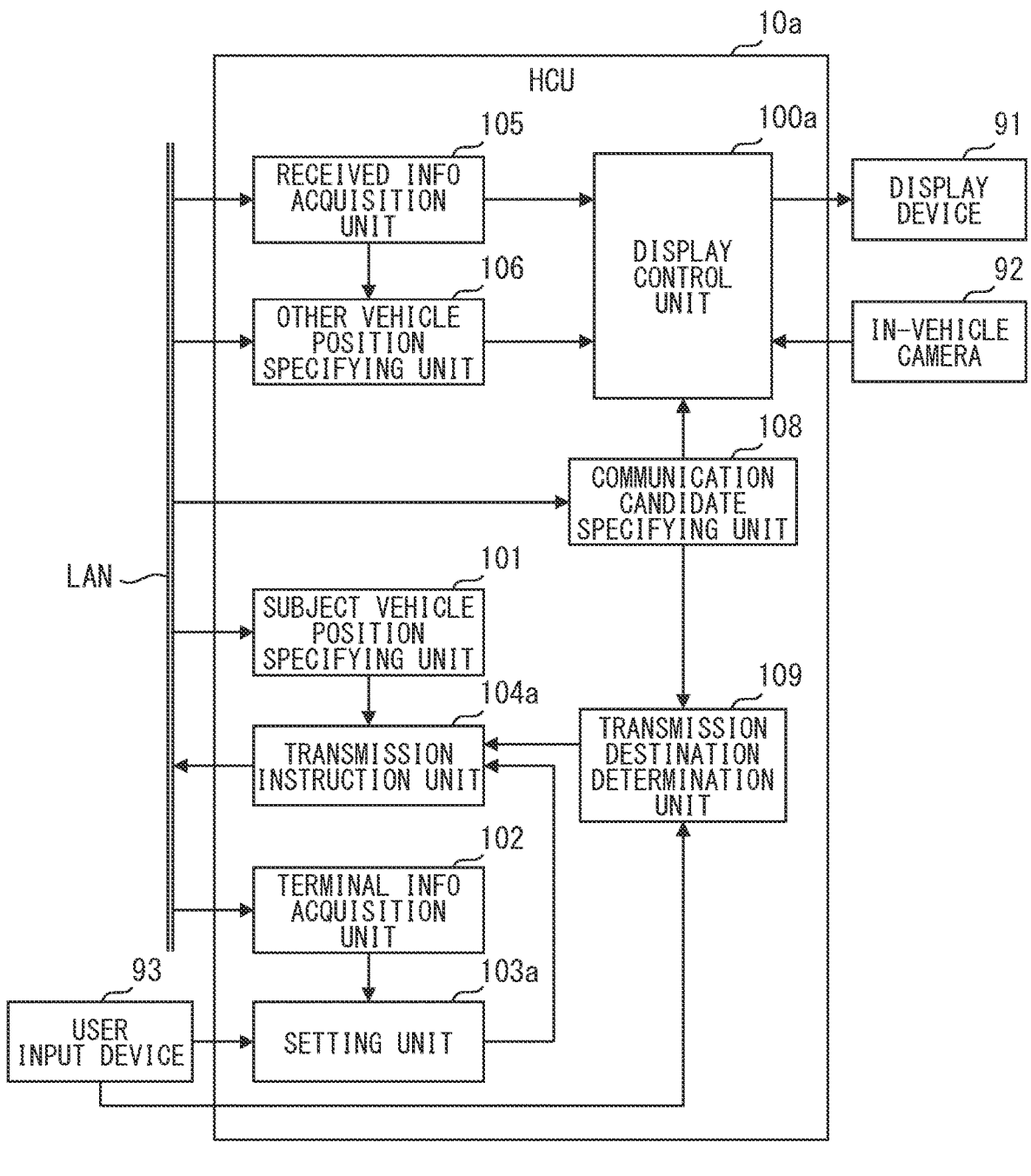
FIG. 6 is a schematic diagram illustrating an example of a configuration of the HCU.

First, a schematic configuration of the HCU 10a will be described with reference to FIG. 6. As shown in FIG. 6, regarding a control of display on the display device 91, the HCU 10a includes a display control unit 100a, a subject vehicle position specifying unit 101, a terminal information acquisition unit 102, a setting unit 103a, a transmission instruction unit 104a, a received information acquisition unit 105, an other vehicle position specifying unit 106, a communication candidate specifying unit 108, and a transmission destination determination unit 109 as functional blocks. The HCU 10a includes the display control unit 100a, the setting unit 103a, and the transmission instruction unit 104a instead of the display control unit 100, the setting unit 103, and the transmission instruction unit 104, respectively. The HCU 10a includes the communication candidate specifying unit 108 and the transmission destination determination unit 109. The HCU 10a does not include the game function unit 107. The HCU 10a is similar to the HCU 10 of the first embodiment except for the above points. The HCU 10a also corresponds to the vehicle control device. Execution of a process of each functional block of the HCU 10a by the computer also corresponds to execution of the vehicle control method.

The setting unit 103a is similar to the setting unit 103 of the first embodiment except that at least DMT information is set as the setting display information. The process in the setting unit 103a also corresponds to the setting step. The setting unit 103a may also set the DPI information as the setting display information.

The transmission instruction unit 104a is similar to the transmission instruction unit 104 of the first embodiment except that at least the DMT information is transmitted as the setting display information to a transmission destination determined by the transmission destination determination unit 109. The process in the transmission instruction unit 104a also corresponds to the transmission instruction step. That is, the transmission instruction unit 104a causes transmission of the position specifying information specified by the subject vehicle position specifying unit 101 and at least the DMT information set by the setting unit 103 to a communicable vehicle determined as the transmission destination by the transmission destination determination unit 109 among communicable vehicles including vehicle systems 1. When the DPI information is also set as the setting display information by the setting unit 103a, the transmission instruction unit 104a may also cause transmission of the DPI information. In the second embodiment, the inter-vehicle communications may be unicast communications.

The communication candidate specifying unit 108 specifies another vehicle (hereinafter, referred to as a communicable vehicle) that can communicate with the subject vehicle via the inter-vehicle communications as a candidate of the transmission destination to which the setting display information is to be transmitted. The communicable vehicle may be another vehicle that can receive a signal of the inter-vehicle communications by an out-of-vehicle communication module 20 of the subject vehicle. The communication candidate specifying unit 108 may specify the communicable vehicle by monitoring the out-of-vehicle communication module 20 of the subject vehicle. When there are multiple communicable vehicles, the communication candidate specifying unit 108 specifies the communicable vehicles as candidates for the transmission destination to which the setting display information is to be transmitted.

The display control unit 100a is similar to the display control unit 100 of first embodiment except that a display (hereinafter, referred to as candidate display) indicating the candidate specified by the communication candidate specifying unit 108 is executed. The display control unit 100a may cause the display device 91 to display the candidate display, or may cause the CID or the like described above to display the candidate display. Examples of the candidate display include displaying a list of accounts of the communicable vehicles identified as the candidates. In addition, the examples of the candidate display includes highlighting the positions of the communicable vehicles specified as the candidates in the image representing the arrangement relationship between the subject vehicle and the surrounding vehicles by the CID or the like. It is assumed that the user (i.e., occupant) of the subject vehicle can select, via input to the user input device 93, the transmission destination of the setting display information from among the communicable vehicles displayed as the candidates.

The transmission destination determination unit 109 determines the transmission destination of the setting display information from among the communicable vehicles in accordance with an input received by the user input device 93 for selecting the transmission destination of the setting display information from among the communicable vehicles specified by the communication candidate specifying unit 108.

The transmission destination determination unit 109 may be determine the transmission destination of the setting display information from among the communicable vehicles specified by the communication candidate specifying unit 108 according to the operation of the subject vehicle. For example, when the subject vehicle changes lanes to a destination lane, a following vehicle in the destination lane may be determined as the transmission destination of the setting display information. In addition, when the subject vehicle enters a priority road from a non-priority road, a following vehicle after the entering may be determined as the transmission destination of the setting display information. Information on the operation of the subject vehicle may be acquired from the automated driving ECU 80. In this case, the candidate display in the display control unit 100a may be omitted.

According to the above configuration, at least the DMT information set according to the input from the user received by the user input device 93 is transmitted to another vehicle desired to be the transmission destination by the user among other vehicles that can communicate with the subject vehicle via the inter-vehicle communications. Therefore, in the other vehicle, the message text set according to the input from the user of the subject vehicle can be displayed to be superimposed at the position of the subject vehicle in the landscape in front of the other vehicle. As a result, the message can be transmitted from the subject vehicle to the other vehicle desired to the transmission destination by the user so that the user of the other vehicle can intuitively and easily determine that the message is transmitted from the subject vehicle.

Figure 7:
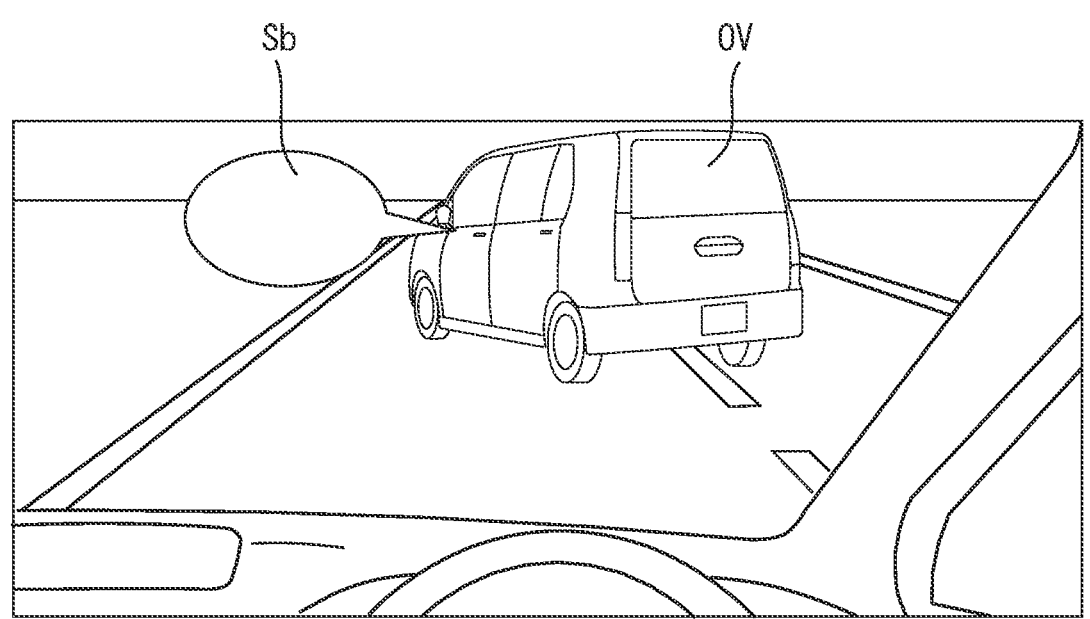
FIG. 7 is a diagram illustrating a display example of a message text.

Here, a display example of the message text will be described with reference to FIG. 7. "OV" in FIG. 7 indicates another vehicle in the landscape in front of the subject vehicle. The other vehicle OV is a vehicle that makes a lane change to the front of the subject vehicle. It is assumed that the subject vehicle has received the position specifying information and the DMT information from the other vehicle OV through inter-vehicle communications. "Sb" in FIG. 7 shows an image of a balloon in which a message text is displayed. The message text is assumed to have contents expressing gratitude for giving way. As illustrated in FIG. 7, the balloon image Sb is displayed to be superimposed at the position of the other vehicle OV in the landscape in front of the subject vehicle. According to this, the user of the subject vehicle who gave way to the other vehicle OV can intuitively understand that the user of the other vehicle OV has conveyed a feeling of gratitude.

Figure 8:
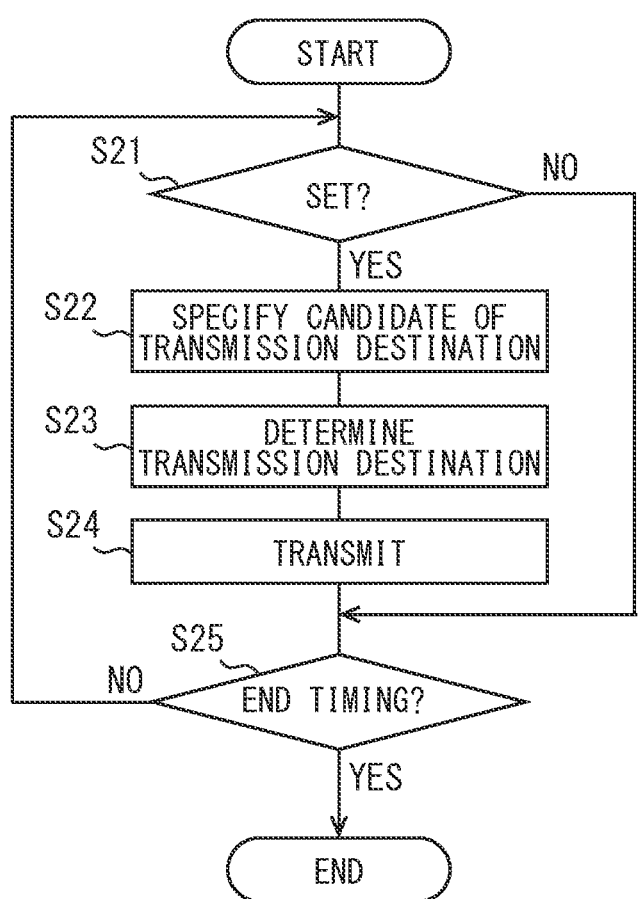
FIG. 8 is a flowchart illustrating an example of a flow of a process related to a transmission instruction in the HCU.

Here, with reference to a flowchart of FIG. 8, an example of a flow of a process (hereinafter, referred to as a process related to a transmission instruction) related to control for causing the HCU 10a to transmit the setting display information will be described. The flowchart of FIG. 8 may be started, for example, when the power switch of the subject vehicle is turned on.

First, in step S21, when the DMT information is determined to have been set by the setting unit 103a (YES in step S21), the process proceeds to step S22. That is, when the DMT information is set by the input from the user, the process proceeds to step 22. On the other hand, when the DMT information is determined not to have been set by the setting unit 103 (NO in S 22), the process proceeds to step S25.

In step S22, the communication candidate specifying unit 108 specifies other vehicles (i.e., communicable vehicles) capable of communicating with the subject vehicle via the inter-vehicle communications as candidates of the transmission destination to which the setting display information is to be transmitted. In step S23, the transmission destination determination unit 109 determines the transmission destination of the setting display information from among the communicable vehicles specified by the communication candidate specifying unit 108 according to the operation of the subject vehicle. For example, when the subject vehicle changes lanes to a destination lane, a following vehicle in the destination lane is determined as the transmission destination of the setting display information.

In step S24, the transmission instruction unit 104a causes transmission of the DMT information determined in step S21 and the position specifying information specified by the subject vehicle position specifying unit 101 to the transmission destination determined in step S22. When the DPI information is also set as the setting display information by the setting unit 103a, the transmission instruction unit 104a also causes transmission of the DPI information.

In step S25, when it is determined to be the end timing of the process related to the transmission instruction (YES in step S25), the process related to the transmission instruction ends. On the other hand, when it is determined not to be the end timing of the process related to the transmission instruction (NO in S25), the process returns to S21 and is repeated. An example of the end timing of the process related to the transmission instruction is that the power switch is turned off.

Figure 9:
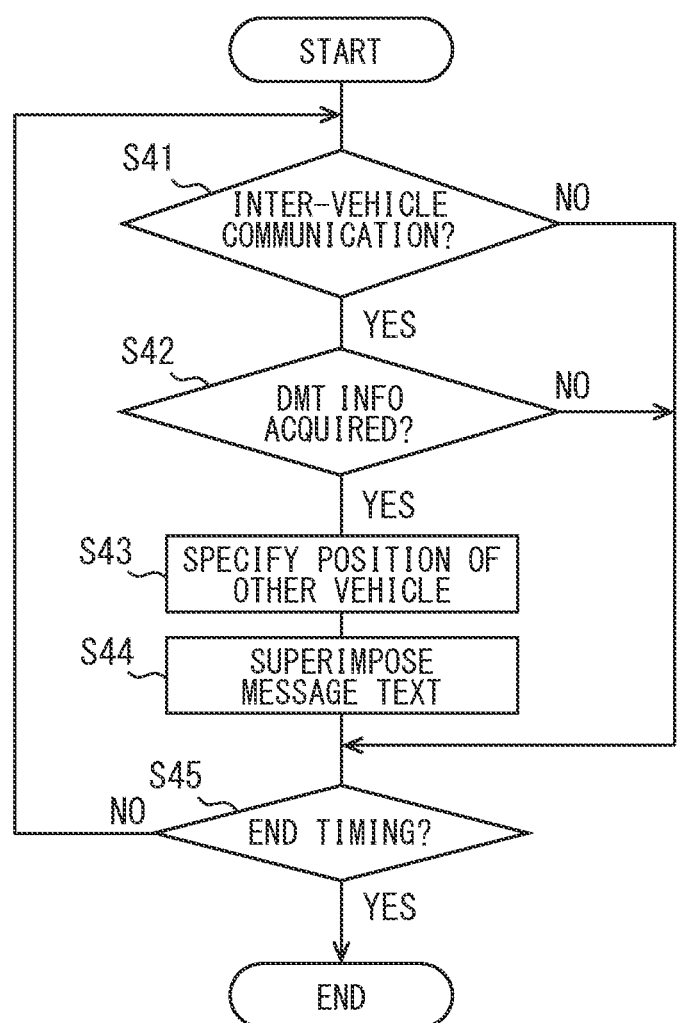
FIG. 9 is a flowchart illustrating an example of a flow of a process related to a superimposed display control in the HCU.

Here, an example of the flow of the process related to the superimposed display control in the HCU 10a will be described with reference to the flowchart of FIG. 9. The flowchart of FIG. 9 may be started, for example, when the power switch of the subject vehicle is turned on. The flowchart of FIG. 9 may be executed regardless of the automation level of the subject vehicle.

In step S41, when the inter-vehicle communications with another vehicle via the out-of-vehicle communication module 20 of the subject vehicle is determined to have been executed (YES in S41), the process proceeds to step S42. On the other hand, when the inter-vehicle communications with the other vehicle is determined not to have been executed (NO in S41), the process proceeds to step S45.

In step S42, the received information acquisition unit 105 acquires the DMT information received by the out-of-vehicle communication module 20 from the other vehicle through the inter-vehicle communications. In step S42, in addition to the DMT information, the position specifying information of the other vehicle received by the out-of-vehicle communication module 20 from the other vehicle through the inter-vehicle communications may be acquired. When the out-of-vehicle communication module 20 has also received DPI information from the other vehicle through inter-vehicle communications, the received information acquisition unit 105 may also acquire the DPI information.

In step S43, the other vehicle position specifying unit 106 specifies the other vehicle position of the other vehicle based on the position specifying information of the other vehicle acquired by the received information acquisition unit 105. In step S44, based on the DMT information acquired in step S42 and the other vehicle position specified in step S43, the display control unit 100a displays the message text set for the other vehicle in the other vehicle such that the message text is superimposed at the position of the other vehicle in the landscape in front of the subject vehicle. The display of the message text may be terminated, for example, after a certain time such as several seconds elapses from the start of the display. In a case where the DPI information is also acquired in step S42, the pseudo image set for the other vehicle in the other vehicle may be displayed to be superimposed at the position of the other vehicle in the landscape in front of the subject vehicle based on the DPI information. In this case, the display control unit 100a may display the message text in a display mode in which the pseudo image utters the message content of the message text.

In step S45, when it is determined to be the end timing of the process related to the superimposed display control (YES in step S45), the process related to the superimposed display control is ended. On the other hand, when it is determined not to be the end timing of the process related to the superimposed display control (NO in S45), the process returns to S41 and is repeated. An example of the end timing of the process related to the superimposed display control includes turning-off of the power switch.

Even in the configuration of the second embodiment, since the message text is displayed to be superimposed at the position of the other vehicle in the landscape in front of the subject vehicle, similarly to the first embodiment, the user of the target vehicle (i.e., subject vehicle) can intuitively and easily identify the nearby vehicle (i.e., other vehicle) capable of communicating with the target vehicle via the inter-vehicle communications.

Third Embodiment

In the above-described embodiments, the HCUs 10, 10a has the functions of the subject vehicle position specifying unit 101, the setting unit 103, 103a, and the transmission instruction unit 104, 104a, but the present disclosure is not necessarily limited thereto. For example, the out-of-vehicle communication module 20 may have at least some of the functions of the subject vehicle position specifying unit 101, the setting unit 103, 103a, and the transmission instruction unit 104, 104a. In this case, the out-of-vehicle communication module 20 also corresponds to the vehicle control device. In a case where the out-of-vehicle communication module 20 has the function of the setting unit 103, 103a, the out-of-vehicle communication module 20 may execute the same process as that of the setting unit 103, 103a of the above-described embodiments by acquiring information from the HCUs 10 and 10a. The same applies to a case where the out-of-vehicle communication module 20 has the function of the transmission instruction unit 104, 104a.

The present disclosure is not limited to the embodiments described above, and various modifications are possible within the scope of the claims. An embodiment obtained by appropriately combining technical means disclosed in different embodiments is also included in the technical scope of the present disclosure. The control device and the control method described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle control device configured to be used in a first vehicle configured to execute automated driving without a monitoring obligation of a driver, the vehicle control device comprising:

a received information acquisition unit configured to acquire display information and position specifying information which are received from a second vehicle different from the first vehicle via inter-vehicle communications, the display information being information for display and independently set for the second vehicle in the second vehicle, the position specifying information being information for specifying a position of the second vehicle;

an other vehicle position specifying unit configured to specify the position of the second vehicle relative to the first vehicle based on the position specifying information acquired by the received information acquisition unit; and a display control unit configured to control display on a display device configured to display an image to be superimposed on a landscape in front of the first vehicle, wherein the received information acquisition unit is configured to acquire the display information including information for displaying a pseudo image that has been set in the second vehicle and virtually representing the second vehicle or an occupant of the second vehicle, the display control unit is configured to superimpose the pseudo image on the position of the second vehicle in the landscape in front of the first vehicle based on the position of the second vehicle relative to the first vehicle specified by the other vehicle position specifying unit and the display information acquired by the received information acquisition unit when the first vehicle is executing the automated driving without the monitoring obligation and an online game is being played in the first vehicle with the second vehicle as a partner via the inter-vehicle communications, the other vehicle position specifying unit is configured to sequentially specify the position of the second vehicle by using a periphery monitoring sensor while the pseudo image is displayed, the display control unit is configured to continuously display the pseudo image to be superimposed on the position of the second vehicle by sequentially tracking the position of the second vehicle based on the sequentially specified position of the second vehicle, the received information acquisition unit is configured to determine whether information for displaying text representing a message has been received from the second vehicle in response to the superimposition of the pseudo image, and the display control unit is configured to display the text in a display mode in which the pseudo image utters a content of the message of the text when the received information acquisition unit determines that the information for displaying the text has been received.

2. A vehicle control method used in a first vehicle and executed by at least one processor, the first vehicle being configured to execute automated driving without a monitoring obligation of a driver, the method comprising:

acquiring display information and position specifying information which are received from a second vehicle different from the first vehicle via inter-vehicle communications, the display information being information for display and independently set for the second vehicle in the second vehicle, the position specifying information being information for specifying a position of the second vehicle;

specifying the position of the second vehicle relative to the first vehicle based on the position specifying information; and controlling display on a display device configured to display an image to be superimposed on a landscape in front of the first vehicle, wherein the acquiring includes acquiring the display information including information for displaying a pseudo image that has been set in the second vehicle and virtually representing the second vehicle or an occupant of the second vehicle, the controlling includes superimposing the pseudo image on the position of the second vehicle in the landscape in front of the first vehicle based on the position of the second vehicle relative to the first vehicle and the display information while the first vehicle is executing the automated driving without the monitoring obligation and an online game is being played in the first vehicle with the second vehicle as a partner via the inter-vehicle communications, the specifying includes sequentially specifying the position of the second vehicle by using a periphery monitoring sensor while the pseudo image is displayed, the controlling includes continuously displaying the pseudo image to be superimposed on the position of the second vehicle by sequentially tracking the position of the second vehicle based on the sequentially specified position of the second vehicle, the acquiring includes determining whether information for displaying text representing a message has been received from the second vehicle in response to the superimposition of the pseudo image, and the controlling includes displaying the text in a display mode in which the pseudo image utters a content of the message of the text based on determining that the information for displaying the text has been received.

3. A vehicle control device configured to be used in a first vehicle configured to execute automated driving without a monitoring obligation of a driver, the vehicle control device comprising a processor configured to:

acquire display information and position specifying information which are received from a second vehicle different from the first vehicle via inter-vehicle communications, the display information being information for display and independently set for the second vehicle in the second vehicle, the position specifying information being information for specifying a position of the second vehicle;

specify the position of the second vehicle relative to the first vehicle based on the position specifying information; and control display on a display device configured to display an image to be superimposed on a landscape in front of the first vehicle, wherein the processor is configured to acquire the display information including information for displaying a pseudo image that has been set in the second vehicle and virtually representing the second vehicle or an occupant of the second vehicle, the processor is configured to superimpose the pseudo image on the position of the second vehicle in the landscape in front of the first vehicle based on the position of the second vehicle relative to the first vehicle and the display information when the first vehicle is executing the automated driving without the monitoring obligation and an online game is being played in the first vehicle with the second vehicle as a partner via the inter-vehicle communications, the processor is configured to sequentially specify the position of the second vehicle by using a periphery monitoring sensor while the pseudo image is displayed, the processor is configured to continuously display the pseudo image to be superimposed on the position of the second vehicle by sequentially tracking the position of the second vehicle based on the sequentially specified position of the second vehicle, the processor is configured to determine whether information for displaying text representing a message has been received from the second vehicle in response to the superimposition of the pseudo image, and the processor is configured to display the text in a display mode in which the pseudo image utters a content of the message of the text when determining that the information for displaying the text has been received.

* * * * *